United States Patent [19]

Boutin et al.

[11] Patent Number: 5,242,622
[45] Date of Patent: * Sep. 7, 1993

[54] PROCESS FOR THE PRODUCTION OF A NEUTRON ABSORBING PELLET, THE PELLET OBTAINED AND THE USE THEREOF

[75] Inventors: Jean Boutin, Saint Martin d'Heres; Airy-Pierre Lamaze, Grenoble, both of France; Gunnar Vesterlund, Västerås, Sweden

[73] Assignees: Compagnie Europeenne du Zirconium Cezus, Courbevoie, France; Asea Brown Boveri, Västerås, Sweden

[*] Notice: The portion of the term of this patent subsequent to Jun. 2, 2009 has been disclaimed.

[21] Appl. No.: 655,994

[22] Filed: Feb. 15, 1991

Related U.S. Application Data

[63] Continuation of Ser. No. 407,284, Sep. 14, 1989, abandoned.

Foreign Application Priority Data

Sep. 15, 1988 [FR] France ............... 88 12550

[51] Int. Cl.$^5$ ............ G21C 7/04; G21C 7/06; G21C 7/24
[52] U.S. Cl. ............... 252/478; 264/0.5; 376/339; 75/393
[58] Field of Search ........ 252/478; 376/339; 419/17, 38, 28, 49, 6; 264/60, 67, 0.5; 75/235, 393

[56] References Cited

U.S. PATENT DOCUMENTS

| | | | |
|---|---|---|---|
| 3,912,798 | 10/1975 | Rachor et al. | 264/0.5 |
| 4,474,728 | 10/1984 | Radford | 376/339 |
| 4,566,989 | 1/1986 | Radford et al. | 252/478 |
| 4,609,524 | 9/1986 | Ferrari | 376/417 |
| 4,645,643 | 2/1987 | Leclerq | 376/447 |
| 4,865,645 | 9/1989 | Planchamp | 75/244 |
| 4,915,903 | 4/1990 | Brupbacher et al. | 420/129 |
| 5,064,607 | 11/1991 | Miller et al. | 376/333 |

*Primary Examiner*—Robert L. Stoll
*Assistant Examiner*—Matthew Zmurko
*Attorney, Agent, or Firm*—Dennison, Meserole, Pollack & Scheiner

[57] ABSTRACT

The invention relates to a process for the production of a neutron absorbing pellet for use in a nuclear reactor control device, comprising the following stages:

a) compactable products are prepared incorporating as % by weight electrolytic crystals or chips of Hf and optionally boron carbide powder with a total weight (HF+B$_4$C) of 40 to 100%, the Hf:(Hf+B$_4$C) ratio being 0.20 to 1 and optionally other metallic elements melting at above 400° C.;

b) these products are mixed and compressed in a mould in one or more filling and compression operations until a pellet is obtained with an apparent density higher than 80% of its average density in the solid state;

c) a sintering treatment is optionally carried out on said pellet;

d) the pellet is or has been extracted from the mould;

e) the pellet is optionally ground.

19 Claims, No Drawings

PROCESS FOR THE PRODUCTION OF A NEUTRON ABSORBING PELLET, THE PELLET OBTAINED AND THE USE THEREOF

This is a continuation of co-pending application Ser. No. 07/407,284 filed on Sep. 14, 1989, now abandoned.

The present invention relates to a process for the production of a neutron absorbing pellet, as well as to the pellet and the use thereof in a control rod of a water nuclear reactor, e.g. a BWR.

Japanese patent application JP-A-60046486 describes a cruciform control rod having metallic absorbing elements of hafnium (Hf), as well as absorbing elements of boron carbide ($B_4C$). The absorbing elements are arranged in such a way as to obtain the same depletion time at each control rod level, so that the use of expensive and heavy Hf and Eu is limited.

Moreover, the abstract of Japanese patent application JP-A-8460286 describes a highly absorbing element for neutrons obtained by moulding or fritting a mixture of ceramic powder ($B_4C$, $HfO_2$, $Eu_2O_3$) and metal (Hf,Eu, Ni,Cu) used as a nuclear poison in nuclear reactors.

As a function of the position of an absorbing element in the control rod, there are variations to the neutron fluxes to be absorbed and the energy of said neutrons and the aforementioned documents show that modifications to the life periods of the absorbing elements and the control rod absorbing power are sought.

The Applicant has sought to develop more easily regulatable and economically manufacturable absorbing means. The Applicant has also aimed at variable absorption capacities along the same neutron absorbing element, thus permitting more precise adaptations to neutron situations.

DESCRIPTION OF THE INVENTION

The invention firstly relates to a process for the production of a neutron absorbing pellet for use in a nuclear reactor control apparatus, e.g. a BWR control cross, characterized in that it comprises the following stages:

a) compatible products are prepared incorporating in % by weight electrolytic crystals or Hf chips and optionally boron carbide powder with a total weight (Hf+$B_4C$) of 40 to 100%, the Hf:(Hf+$B_4C$) ratio being 0.20 to 1 and optionally other metallic elements melting at above 400° C.;

b) these products are mixed and compressed in a mould in one or more filling and compression operations until a pellet is obtained with an apparent density above 80% of its average density in the solid state and typically between 85 and 95% of said density;

c) a sintering treatment is optionally performed on said pellet;

d) said pellet is or has been extracted from the mould;

e) the pellet is optionally ground, to bring its diameter to such a value that it slides well in a metal sheath or in a blind hole of a control rod, to within a tolerance of ±0.02 mm or even closer. In the absence of grinding, tolerances of ±0.03 mm on the diameter are typically obtained.

Thus, the pellets according to the invention have Hf and optionally B contents chosen on request and they are typically placed in a reactor control apparatus at locations in which their Hf/$B_4C$ composition, chosen on the basis of experience and/or neutron absorption efficiency calculations, will permit an optimum depletion rate.

The compactable Hf products used preferably contain at least 20% by weight of electrolytic or electrolysis crystals, used here in a novel and particularly surprising manner. The interest of these crystals is that they represent preferably 0.5 to 1 times the total Hf weight, more preferably 0.8 to 1 times the total Hf weight and in particular all the Hf weight.

The Applicant has found that Hf electrolytic crystals are particularly suitable for compacting by compression and that they did not have the normal pyrophoric character of finely divided Hf, e.g. obtained from a Kroll sponge.

Typically, these crystals have an apparent density between 2 and 6 $g/cm^3$ and, individually, a size varying between 0.1 to 3 or 4 mm, with a solid or acicular appearance as a function of the electrolysis conditions. They are often grouped into aggregates corresponding to the simultaneous growth of dendrites or needles along several crystal axes, the size of these aggregates then being typically 3 mm to 2 cm. The largest aggregates are either eliminated for said use, or are broken down, e.g. by grinding in order to return to a size typically below 0.5 to 0.3 times the diameter or thickness of the compact product to be obtained.

At the end of the electrolysis process, which typically takes place in a melted chloride bath, the Hf electrolytic crystals are usually washed and dried. Their H and Cl contents at this stage, normally respectively below 40 and 50 ppm, can be lowered to less than 25 to 30 ppm by carefully adjusting the electrolysis conditions, optionally completed by a more extensive than ambient drying at between 150° and 300° C. under a vacuum better than 1.3 Pa or under an inert gas.

The H and Cl purification can be further improved by subjecting the electrolytic crystals to a treatment for 8 to 48 h between 1000° and 1250° C. and typically 16 to 32 h between 1050° and 1150° C., under a vacuum better than 1 mPa, instead of a treatment at between 150° and 300° C. This leads to residual H and Cl contents respectively below 20 and 10 ppm.

The direct use of Hf electrolytic crystals is of great industrial and economic interest. The Hf economically obtained with an excellent purity and it is very suitable for compacting by compression, which appears to be linked with a high proportion of voids leading to the aforementioned densities (2 to 6 $g/cm^3$), which are very low compared with the density of solid Hf (=13.29 $g/cm^3$).

The invention is not only interested in the production of pellets containing hafnium in the form of electrolytic crystals, but also in the production of pellets containing both Hf and $B_4C$ in chosen proportions, the Hf/(Hf+$B_4C$) ratio preferably having a value between 0.20 and 0.80. Another possibility of adjusting the absorbing powers and the mechanical characteristics of the compressed articles or tablets, particularly when there is no fritting treatment, is to include in the mixture to be compressed other metallic elements melting at above 400° C. and including, in % by weight of the total:

Zr and/or Zr alloys=0 to 60%
Ti and/or Ti alloys=0 to 60%
Hf-Zr alloys with a Zr content of <55%=0 to 60%
Hf-Ti alloys with a Ti content<55%=0 to 60%
neutron absorbing metallic elements melting at above 400° C.:<0.2%
other metallic elements melting at above 400° C.:<3%.

These metallic products, which must be compactable within the starting mixture formed, are essentially in the form of electrolytic crystals and/or chips and/or sponges, the term "chips" designating metallic fragments resulting from machining operations such as turning, milling, drilling and optionally small rejects or refuse of unitary volume generally below 1 cm$^3$, whilst the term "sponge" designates products resulting from a reduction by Mg or Kroll reduction in the case of Hf, Zr and Ti. Apart from Hf electrolytic crystals, these products can include Zr and/or Ti electrolytic crystals having H and Cl contents respectively below 40 and 50 ppm. It is possible to apply thereto the same thermal purification treatments as for the Hf electrolytic crystals.

The pellets are conventionally obtained by means of several successive filling and compression operations in the manner described hereinbefore. A sintering treatment may be desired, generally before a grinding operation, such as grinding with an abrasive wheel. This sintering treatment in a reducing atmosphere under pressure is typically performed at between 1970° and 2030° C.

A second object of the invention is the pellets obtained, which typically have the following composition in % by weight:

Hf 20 to 100%, the total Hf weight incorporating at least 20% electrolytic crystals
B$_4$C: 0 to 80%
(Hf+B$_4$C): 40 to 100%
Zr+Ti: 0 to 60%
other metallic elements melting at above 400° C.: <6%.

These pellets can easily be detected when they have not undergone high temperature thermal treatment, the Hf electrolytic crystals being detectable therein. These crystals then typically constitute at least half the weight of the Hf present. Frequently, these pellets contain both Hf and boron carbide, occupying either all, or at least 40% of the total weight with Hf/Hf+B$_4$C) between 0.20 and 0.80.

The invention has a further object various uses of pellets obtained by the process according to the invention with Hf and optionally B contents adjustable in a continuous manner, in the control rods of water nuclear reactors:

either directly in a recess of a control rod, e.g. a blind hole plugged after filling, the pellets having Hf and B$_4$C contents varying as a function of their individual positions;

or in the form of a sheathed neutron absorbing element fixed to a control rod, which then gives pellets in a metal sheath, e.g. a tube sealed at one end and said sheath is sealed, the pellets either having the same Hf and optionally B$_4$C contents in said absorbing element and which will depend on the position of the element in the control rod, or individual Hf and optionally B$_4$C contents varying as a function of their positions in said element.

ADVANTAGES OF THE INVENTION

There are numerous, economically important advantages: surprising use of pure Hf in the form of electrolytic crystals avoiding complicated and costly transformations;

flexibility with regards to the sources or forms of metals and alloys;

possibility of producing compressed pellets with a non-circular, convex or partly concave cross-section;

easy adjustment of the Hf and B$_4$C contents;
possibility of varying these contents in a sheathed element or directly on the control rod;
simplicity of the production process.

EXAMPLES

Example 1

A mixture of equal weights of Hf electrolytic chips and boron carbide powder of average grain size 16 μm is prepared. By means of three partial fillings and compressions five circular cylindrical compressed articles or tablets are produced with a diameter of 5.95 mm and a height of 100 mm. The apparent density obtained is 0.88 to 0.91. The tablets then undergo grinding on a centreless machine, their ground surfaces being satisfactory.

EXAMPLE 2

5 batches of 4 pellets of diameter 5.95 mm and height 15 mm are prepared, these 5 successive batches being constituted by Hf and B$_4$C with contents graded as follows:

|  | Contents (% by weight) | |
| --- | --- | --- |
|  | Hf | B$_4$C |
| Batch No. 1 | 70 | 30 |
| Batch No. 2 | 60 | 40 |
| Batch No. 3 | 50 | 50 |
| Batch No. 4 | 40 | 60 |
| Batch No. 5 | 30 | 70 |

The compressed tablets with a diameter of 6.1 mm are then ground to a diameter of 5.95±0.01 mm. Five pellets from each of the 5 batches are introduced into a stainless steel tube with an internal diameter 6.0 mm, thickness 0.8 mm and length 100 mm, sealed at one end by a welded plug of height 12.5 mm. After introducing 5 pellets into the tube in decreasing Hf content order, the second plug of the tube is put into place and welded and the interior placed under a vacuum, with lateral welding of the tube end.

This filling and sealing are repeated twice without any problem. It should be noted that these pellets with graded Hf and B$_4$C contents could also be introduced in unsheathed form into a recess of a control rod.

We claim:

1. Process for the production of a neutron absorbing pellet for use in a nuclear control device, comprising the steps of:
    a) forming a compactable product consisting essentially of, by weight,
        about 40–100% of a component containing about 20–100% of electrolytic crystals or chips of Hf and the remainder B$_4$C; and
        about 0–60% of other metallic elements melting at above 400° C.;
        said Hf crystals or chips comprising at least about 20% by weight electrolytic Hf crystals;
    b) mixing and compressing said compactable product in a mold in at least one filing and compressing operation, to obtain a pellet with an apparent density greater than 80% of its average density in the solid state;
    c) optionally, sintering said pellet;
    d) removing said pellet from the mold; and
    e) optionally grinding the removed pellet.

2. Process according to claim 1, wherein the weight of the electrolytic Hf crystals is 0.5 to 1 times the total Hf weight.

3. Process according to claim 1, wherein all the Hf is in the form of electrolytic crystals.

4. Process according to claim 1 or 2, wherein the electrolytic crystals used have average H and Cl contents respectively below 25 and 30 ppm.

5. Process according to claim 4, wherein there is a prior treatment of the electrolytic crystals used at between 150° and 300° C. in vacuo or under inert gas.

6. Process according to claim 4, wherein the electrolytic crystals used undergo a prior treatment for 8 to 48 h between 1000° and 1250° C., said crystals then having average H and Cl contents respectively below 20 and 10 ppm.

7. Process according to claim 6, wherein the electrolytic crystals used undergo a prior treatment for 16 to 32 h between 1050° and 1150° C.

8. Process according to claim 1 or 2, wherein said component contains about 20–80% Hf.

9. Process according to claim 1 or 3, wherein said other metallic elements comprise, by weight of the total:
   Zr and/or Zr alloys=0 to 60%
   Ti and/or Ti alloys=0 to 60%
   Hf-Zr alloys of Zr content 21 55%=0 to 60%
   Hf-Ti alloys of Ti content 21 55%=0 to 60%
   neutron absorbing metallic elements melting at above 400° C.: <0.2%
   other metallic elements melting at above 400° C.: <3%.

10. Process according to claim 1 or 2, additionally comprising placing the pellets in a recess of a control rod, said pellets having Hf and $B_4C$ contents varying as a function of their individual positions.

11. Process according to claim 1 or 2, additionally comprising introducing these pellets into a metal sheath and the latter is sealed, thus giving a sheathed neutron absorbing element.

12. Process according to claim 11, wherein said pellets have the same respective Hf and optionally $B_4C$ contents chosen as a function of the position of the absorbing element in a control rod.

13. Process according to claim 11, wherein said pellets have individual Hf and optionally $B_4C$ contents varying as a function of their position in said absorbing element.

14. Compressed pellet produced by the process of claims 1 or 4 comprising in % by weight:
   Hf 20 to 100%, the total Hf weight being at least 20% of electrolytic crystals;
   $B_4C$: 0 to 80%;
   Zr+Ti: 0 to 60%;
   other metallic elements melting at above 400° C.: <6%, said pellet comprising about 40–100% of (Hf+$B_4C$).

15. Pellet according to claim 14, wherein Hf/(Hf+$B_4C$)=0.20 to 0.80.

16. Pellet according to claim 14, wherein at least half of the Hf is in the form of electrolytic crystals.

17. Pellet according to claim 16, wherein Hf/(Hf+$B_4C$)=0.20 to 0.80.

18. Process according to claim 1, wherein said electrolytic Hf crystals have an apparent density of about 2 to 6 g/cm$^3$.

19. Process according to claim 1, wherein said crystals have a crystal size of about 0.1 to 4 mm.

* * * * *